(12) United States Patent
Daraskevich et al.

(10) Patent No.: US 6,602,552 B1
(45) Date of Patent: Aug. 5, 2003

(54) LOW TEMPERATURE CURE COATING COMPOSITION AND METHOD THEREFORE

(75) Inventors: Edward J. Daraskevich, Oswego, IL (US); Ronald J. Lewarchik, Brighton, MI (US); Mark P. Slawikowski, Palos Heights, IL (US); Sebastian E. McCann, Woodstock, IL (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/712,496

(22) Filed: Nov. 14, 2000

(51) Int. Cl.[7] .............................. B05D 3/02; B05D 7/16
(52) U.S. Cl. .................................... 427/388.1
(58) Field of Search ...................... 427/388.1

(56) References Cited

U.S. PATENT DOCUMENTS

| | | | |
|---|---|---|---|
| 3,507,837 A | * 4/1970 | Hidinger | |
| 3,808,168 A | * 4/1974 | Young et al. | 524/376 |
| 4,518,746 A | 5/1985 | Sekmakas et al. | 525/443 |
| 5,840,827 A | 11/1998 | Zupancic et al. | 528/272 |
| 5,852,162 A | 12/1998 | Smith et al. | 528/272 |
| 5,972,422 A | 10/1999 | Harmon | 427/140 |
| 6,045,872 A | * 4/2000 | Harmon et al. | 427/407.1 |

FOREIGN PATENT DOCUMENTS

| | | | |
|---|---|---|---|
| EP | 319 607 | | 12/1987 |
| EP | 709 415 | | 10/1995 |
| GB | 1041879 | * | 9/1966 |
| JP | 05-078614 A2 | * | 3/1993 |
| JP | 05-078615 A2 | * | 3/1993 |

* cited by examiner

*Primary Examiner*—Erma Cameron
(74) *Attorney, Agent, or Firm*—Anne Sabourin

(57) ABSTRACT

A method for a low temperature cure for a coating composition comprising: applying to a substrate a low temperature curing coating composition consisting essentially of a film forming component consisting essentially of a non-carbamate functional polymeric component selected from the group consisting of polyester, silicone modified polyester, polyurethane, acrylic, alkyd, epoxy, polyamide, phenolic and polysilane polymers and mixtures thereof; a crosslinking component to crosslink the non-carbamate functional polymeric component; a catalyst selected from the group consisting of Lewis acids, perflouracetic acid, methane sulfonic acid catalyst and mixtures thereof; and additives selected from the group consisting of solvents, flow control agents, pigments, flexibilizing resins, surfactants, waxes, wetting agents, plasticizers, antioxidants, UV light absorbers, and a mixture thereof, and subjecting the coated substrate to a cure temperature of between 280° F. and 450° F., for a time sufficient to cure the coating.

10 Claims, No Drawings

LOW TEMPERATURE CURE COATING COMPOSITION AND METHOD THEREFORE

FIELD OF THE INVENTION

This invention relates to coating compositions having a low curing temperature and short cure time.

BACKGROUND OF THE INVENTION

The present invention is directed to a method for decreasing the bake temperature and cure or dwell time of a coating process by utilizing a coating composition comprising a Lewis acid catalyst or a trifluoroacetic acid catalyst.

A method for coating over a cured coating with a coating containing Lewis acid catalysts is taught in U.S. Pat. No. 5,972,422 to Harmon et al., for a Method for Low Bake Repair of Composite Color Plus Clear Coatings and Compositions for Use Therein. These coatings however, are directed to low bake repair methods, where a coating comprising a carbamate functionality is applied over an area having a cured coating on it already. The repair coating requires a carbamate functional resin and is an automotive repair coating process for OEM.

Another references teaching the use of a Lewis Acid catalyst in a coating is U.S. Pat. NO. 6,045,872 to Harmon for a Method for Eliminating Wrinkling in Composite Color-Plus-Clear Coating and Compositions for Use Therein. This reference is also limited to a method using a coating containing a carbamate functional resin in a coating method for automotive coatings in an OEM coating process.

The coatings in both Harmon references are directed to carbamate coatings which cure for much longer times, and which provide a more brittle coating than those coatings contemplated by the present invention. Additionally, the coatings taught in Harmon are directed for use in processes for coating in OEM automotive applications.

The present invention is directed to industrial coating compositions that are used in a wide variety of coating applications, including application to primed metal and direct to metal coatings. These coatings include both liquid and powder coatings. The coatings are applied by a variety of methods including for liquids, electrodeposition, spraying, extruding, plate coating, dipping, and coil coating, and for powders, cloud chamber, plasma coating and electrostatic deposition. These coatings are applied to metal and plastic substrates.

Coatings applied by the above described methods employ forming a film of a liquid or powder coating composition at temperatures between about 280° F. and 450° F. (232° C.) at a thickness of between 0.01 and 5 mils, for a period of between about 10 minutes and about 40 minutes.

In the coil coating operation, a coil of sheet metal is uncoiled as it is pulled through a series of rollers, one or more of which is a paint applicator roller, at up to about 600 feet per minute. It is then passed through a curing oven and coiled again for the market. The paint is picked up by a roller rotating in the paint pan and transferred to a reverse or direct applicator roller. The cure temperature in a coil coating operation is typically measured as a peak metal temperature (PMT). The peak metal temperature is generally between 425° F. and 525° F. using a conventional acid catalyst such as aromatic sulfonic acid catalysts, including napthalene disulfonic acid, dinonyl napthalene sulfonic acid, para-toluene sulfonic acid, and dececylbenzene sulfonic acid, other acids such as phosphate acid catalysts including phosphoric acid, and mono- and dibutyl acid phophate may also be used. The curing times range generally from 14 to 40 seconds.

The present invention provides an improvement over the known methods of coil coating by providing a low temperature curing composition by use of the Lewis Acid or perfluoroacetic acid, or methane sulfonic acid catalyst, or any mixture of these catalysts in the present invention provides a curing at lower temperatures than those of a coating using other catalysts. This results in savings on energy costs to the coater and increased line speeds which result in larger volumes of coated product and higher productivity to the coater.

SUMMARY OF THE INVENTION

The present invention is directed to a method for coating a metallic substrate comprising the steps of applying to a substrate a low temperature cure coating composition consisting essentially of a non-carbamate polymeric film forming component selected from the group consisting of polyester, polyurethane, acrylic, alkyd, epoxy, polyamide, and polysilane polymers and mixtures thereof, a crosslinking component to crosslink the polymeric component, and a catalyst selected from the group consisting of Lewis acids, trifluoroacetic acid, methane sulfonic acid and mixtures thereof, wherein the coated substrate is subjected to a low cure temperature for a time sufficient to cure the coating composition.

DETAILED DESCRIPTION OF THE INVENTION

The present invention is directed to a method for coating a metallic or plastic substrate to minimize the cure temperature and cure or dwell time used in the coating process. The process comprises the steps of applying to a substrate a low temperature curing coating composition consisting essentially of a non-carbamate polymeric film forming component, a crosslinking component to crosslink the polymeric component, and a catalyst selected from the group consisting of Lewis acids, trifluoroacetic acid, methane sulfonic acid and mixtures thereof. It is believed that the specific catalysts utilized in the present invention lower the cure temperature and cure time of the coating. The coating is applied to a substrate, either directly or to a coated or uncoated substrate. When the uncoated substrate is metal, it is referred to as "direct to metal", or the coating may be applied to a substrate that has been coated with a first coating such as a primer or other coating. In processes such as spraying, electrodeposition, extruding, plate coating, dipping, powder coating, cloud chamber, plasma coating and electrostatic deposition, the typical,cure time ranges from 10 to 40 minutes, at temperatures between 250° F. and 450° F., contrasting with the method of the present invention, where the cure time is reduced to about 5 to 25 minutes, generally at reduced temperatures between 180° F. and 350° F. In coil coating, generally the cure time ranges from about 10 to about 60 seconds at temperatures between about 425° F. to 525° F., in contrast to the present invention, where the cure time ranges from about 5 to about 60 seconds and more preferably from about 7 to about 40 seconds and most preferably from about 7 to about 35 seconds, generally at a curing temperature of between about 300° F.(135°) and about 450° F.(232° C.). In coil coating the cure temperature is referred to as the peak metal temperature. It is desirable to minimize the cure temperature and cure or dwell time used in all coating processes. Using the specific catalysts described in the present invention enables cure times and temperatures to be reduced to levels below that in coating compositions utilizing catalysts other than those defined in the present invention.

The non-carbamate functional film forming polymer component useful in the coatings of the present invention consists essentially of polymers selected from the group consisting of polyester, polyurethane, acrylic, alkyd, epoxy, polyamide, and polysilane polymers and mixtures thereof. Most preferably, the coating is a polyester, acrylic or polyurethane polymer or any combination thereof. Polymers useful in the present invention are described as follows. The non-carbamate functional polymer is present in the coating composition in an amount between 10% and 90% by weight, based on total coating composition weight. More preferably, the polymer is present in amount between 20% and 80% by weight and most preferably between 25% and 65% by weight, based on total coating composition weight.

Polyester compositions useful for solvent borne coatings in accordance with the invention are formed by polyesterification of organic polycarboxylic acids and polyhydric alcohols. Suitable acids include but are not limited to, phthalic acid, isophthalic acid, hexahydrophthalic acid, adipic acid, succinic acid, fumaric acid, maleic acid, isophthalic acid, cyclohexyl dicarboxylic acid, azeleic acid, sebacic acid, dimethylolpropionic acid, and ricinoleic acid and mixtures thereof, and hydroxy acids such as 12-hydroxystearic acid and mixtures thereof or the anhydrides of any of these acids and mixtures thereof, and mixtures of any of these acids and anhydrides.

Suitable polyhydric alcohols for reaction with the acid or anhydride to form the polyesters include but are not limited to 1,4-butanediol, 1,6-hexanediol, neopentyl glycol, ethylene glycol, propylene glycol, diethylene glycol, dipropylene glycol, butylene glycol, glycerol, trimethylolpropane, pentaerythritol, sorbitol and 2,2,3,3,4,4-hexafluoro-1,5-pentanediol. Suitable alcohols include alcohols derived from fatty alcohols. Particularly preferred are dimer fatty alcohols. Other components of polyesters can include lactones or mixtures of lactones, such as epsilon.-caprolactone and delta.-butyrolactone.

Polyester compositions in accordance with the invention may form in a polycondensation reaction between polyols, predominantly diols, and carboxylic acids and/or anhydrides of carboxylic acids. The polyesters may be linear or branched. Substantially linear polyesters may be formed by reacting predominantly diols, carboxylic acids or anhydrides of carboxylic acids. A small amount of triol, e.g., trimethylol may also be included. The polyester resin preferably has a number average molecular weight, as determined by the GPC method using the polystyrene standard of between 2,000 and 15,000, more preferably between 3,000 and 6000 and most preferably between 3,000 and 4,000.

Waterborne polyester coating compositions comprise partially neutralized acidic functional polyesters dispersed in water as very fine particles may be utilized in the present invention. Such compositions form coating compositions which have low VOCs, i.e., about 1.5 lbs/gal. or below and even as low as about 0.5 lb/gal. or below. The polyesters may be formed for example, from between about 30 and about 60 mole percent polycarboxylic acids and the of which at least about 80 mole percent comprises cyclohexanedicarboxylic acids and the 1,2, 1,3 and 1,4 isomers thereof, or the anhydride thereof, and ring-alkylated derivatives of each, e.g., derivatives in which one or more alkyl group(s) of up to about seven carbon atoms is bound to the cycloaliphatic ring. Of the polycarboxylic acid content, at least about 80 mole percent comprises cyclohexanedicarboxylic acids, preferably at least about 90 mole percent and most preferably at least about 100 mole percent. The balance of the carboxylic acid content, if any, is preferably substantially all dicarboxylic acids and preferably substantially all aliphatic dicarboxylic acids. Carboxylic acids of functionality greater than 2 may be used to a minor extent if branching is desired, but generally linear polyester chains are preferred. The polyester may also contain some aromatic polycarboxylic content, but aromatic polycarboxylic acids are considered to be undesirable as they tend to detract from UV-stability.

The polyester preferably further comprises between about 35 and about 70 mole percent polyols, at least about 95 mole percent of the polyol content comprising diols, and between about 40 and about 100 mole percent of the polyol content comprising cycloaliphatic diols. Between about 40 and about 100 mole percent of the polyol content of the polyester comprises cycloaliphatic diols, such as 1,4-cyclohexanediol, 1,4-cyclohexanedimethanol, hydrogenated bisphenol A, 1,2-cyclopentanediol, 1,3-cyclopentanediol, 1,2, 1,3, 1,4, and 1,5-cyclooctanediol. Of the remaining up to about 60 mole percent of the polyol content, the major portion comprises diols, although up to about 15 mole percent may be higher number diols. Polyols having more than two hydroxy groups may be used to provide branching which imparts increased chemical resistance, durability and stain resistance, depending on the relative amounts used, but at the expense of flexibility and solution viscosity. Preferably, the content of polyols having hydroxyl functionality greater than two, e.g., three or four, is no greater than about 5 mole percent of polyol content, but may be advantageously employed at amounts greater than about 0.5 mole percent.

If desired, suitable non-cyclic polyols include, for example, 1,6 hexanediol, pentaerythritol, trimethylolpropane, 2-methyl-1,3-propanediol, neopentyl glycol, 2-butyl-2-ethyl-1,3-propanediol, ethylene glycol, 1,4-butanediol, 1,3-butanediol, 1,5-pentanediol and trimethylol ethane.

The polyester further comprises between about 5 and about 25 mole percent of a monomer having dihydroxy, monocarboxylic acid functionality. Examples of aliphatic acids which may be included include succinic acid, glutaric acid, adipic acid, pimelic acid, suberic acid, azelaic acid, sebacic acid, diglycolic acid, 1,12-dodecanoic acid, tetrapropenyl succinic acid, maleic acid, fumaric acid, itaconic acid, malic acid, etc. Examples of aromatic dicarboxylic acids are phthalic acid, isophthalic acid, terephthalic acid, benzophenone dicarboxylic acid, diphenic acid, 4,4'dicarboxydiphenyl ether, 2,5-pyridine dicarboxylic acid, trimellitic acid, etc. Preferably at least about 95 mole percent and most preferably about 100% of the dicarboxylic acid content is cycloaliphatic or aliphatic.

The polyester may be formed by any of the conventional methods. It is preferred that the polyester be formed at a temperature no higher than about 2000 C. The use of a catalyst is preferred, as is the passage of an inert gas through the reaction mixture to protect against discoloration and to aid in the liberation of water from the mixture as it is produced by the condensation. The esterification takes place almost quantitatively and may be monitored by determining the acid and/or hydroxyl numbers or by monitoring the viscosity of the product.

The molar ratio of polyol +monomer/acid is between about 1.01 and about 1.30, whereby the polyester is hydroxyl-terminated having hydroxyl numbers of between about 20 and about 150. The polyester has an acid numbers between about 30 and about 100. Preferably, no more than about 5 mole percent of the monomers which form the polyester have aromatic groups. The polyesters have weight average molecular weights ranging from about 100 to about 20,000.

The acrylic resins useful in the present invention preferably have a molecular weight of 500 to 1,000,000, and more preferably of 1500 to 50,000. As used herein, "molecular weight" refers to number average molecular weight, which may be determined by the GPC method using a polystyrene standard. Such polymers can be prepared from acrylic and methacrylic monomers such as methyl acrylate, acrylic acid, butyl acrylate, ethyl acrylate, methacrylic acid, methyl methacrylate, butyl methacrylate, cyclohexyl methacrylate, styrene and the like. A functional group can be incorporated into the ester portion of the acrylic monomer. For example, hydroxy-functional acrylic monomers that can be used to form such polymers include hydroxyethyl acrylate, hydroxybutyl acrylate, hydroxybutyl methacrylate, hydroxypropyl acrylate, and the like; amino-functional acrylic monomers may include t-butylaminoethyl methacrylate and t-butylamino-ethylacrylate; acid-functional monomers may include acrylic acid, methacrylic acid, and itaconic acid; epoxide-functional monomers may include glycidyl acrylate and glycidyl methacrylate.

Modified acrylics can also be used as the polymer according to the invention. Such acrylics may be polyester-modified acrylics or polyurethane-modified acrylics, as is well-known in the art. Polyester-modified acrylics modified with ε-caprolactone are described in U.S. Pat. No. 4,546,046 of Etzell et al., the disclosure of which is incorporated herein by reference. Polyurethane-modified acrylics are also well-known in the art. They are described, for example, in U.S. Pat. No. 4,584,354, the disclosure of which is incorporated herein by reference. Preferred acrylic resins have a glass transition temperature (Tg) in the range of about +10° C. to +50° C. It is necessary that the polymer provide a flexible coating for the substrate.

In general, polyurethanes are prepared by reaction of a polyisocyanate component with a polyol component. Preferably, the polyurethane is linear (that is, it is prepared by reacting one or more diisocyanates with one or more diols). Hydroxyl functional polyurethanes may be prepared by reaction of an excess of equivalents of diol with diisocyanate(s). Hydroxyl-functional or amine-functional polyurethanes may also be prepared by reacting an isocyanate-terminated polyurethane with an excess of equivalents of a diol, polyol, polyamine, or amino alcohol (such as diethanol amine) in a capping step. Acid-functional polyurethanes may be synthesized by including a monomer having acid functionality, for example, without limitation, dimethylolpropionic acid. The hydroxyl groups react to form the urethane linkages while the acid group remains unreacted in the polyurethane polymerization.

Preparation of polyurethanes for coating compositions are described in many publications. In general, monomeric polyisocyanates such as those mentioned already may be used in preparing the polyurethane. Aliphatic diisocyanates, particularly IPDI, are preferred. Useful active hydrogen-containing chain extension agents generally contain at least two active hydrogen groups, for example, diols, dithiols, diamines, or compounds having a mixture of hydroxyl, thiol, and amine groups, such as alkanolamines, aminoalkyl mercaptans, and hydroxyalkyl mercaptans, among others. For purposes of this aspect of the invention both primary and secondary amine groups are considered as having one active hydrogen. Active hydrogen-containing chain extension agents also include water, pentaerythritol, among other compounds. Polymeric chain extension agents can also be used, such as polyester polyols, polyether polyols, polyurethane polyols, or polymeric amino group-containing polymers, and it is often preferred to include these. Mixtures of any of the above chain extension agents can also be used.

The reaction of the polyisocyanate and chain extension agent is conducted by heating the components in a suitable reaction medium such as xylene or propylene glycol monoethylether acetate. The use of catalysts for this reaction, e.g., organotin catalysts such as dibutyltin diacetate, is well-known in the art. Polyurethanes useful as the polymeric component may have a number average molecular weight of from 600 to 6000. Various groups, such as nonionic polyether stabilizing groups, ionic stabilizing groups (e.g., carboxyl groups), unsaturated groups, and the like may be incorporated or appended to the material, as is known in the art. Active hydrogen or isocyanate terminal groups may be provided by adjusting the stoichiometry of the chain extension agent and polyisocyanate in the reaction mixture. A molar ratio of active hydrogen:NCO in the reaction mixture of less than 1 will tend to provide isocyanate-terminated polymers. Other terminal groups may be provided by the use of capping agents. For example, an acid terminal group can be provided by capping an isocyanate-terminated polymer with a hydroxyacid. Pendant functional groups may be provided by using chain extension agents having two active hydrogen groups and the desired functional group, e.g., dimethanol propionic acid, as noted above.

The phenolic resins useful in the present invention are commonly referred to as phenoplasts and are obtained by the condensation of phenol or alkyl substituted phenols with aldehydes. The monohydric phenols such as phenol, cresol and xylenol are the most typically utilized since they are readily available and relatively inexpensive. Phenol is the typically preferred monohydric phenol. Polyhydric phenols such as resorcinol can also be used herein. Formaldehyde is the preferred aldehyde used in the production of the phenolic resins. Other useful aldehydes include acetaldehyde, butyraldehyde and furfuraldehyde or mixtures thereof. The preferred phenolic resin is produced by the condensation of phenol and formaldehyde.

The polyepoxides useful for the present invention are those materials having a 1,2 epoxide group present in the molecule. Hydroxyl groups may also be present and often are. Polyepoxides contain more than one 1,2-epoxy group per molecule. In general, the epoxide equivalent weight can range from about 280 to about 4,000. These polyepoxides are saturated or unsaturated, cyclic or acyclic, aliphatic, alicyclic, aromatic or heterocyclic. They can contain substituents such as halogen, hydroxyl and ether groups. One useful class of polyepoxides comprises the epoxy polyethers obtained by reacting an epihalohydrin (such as epichlorohydrin or epibromohydrin) with a polyphenol in the presence of an alkali. Suitable polyphenols include resorcinol, catechol, hydroquinone, bis(4-hydroxyphenyl)-2,2-propane, i.e., bisphenol A; bis(4-hydroxyphenyl)- 1,1-isobutane; 4,4-dihydroxybenzophenone; bis(4-hydroxyphenyl)- 1,1-ethane; bis(2-hydroxynaphenyl)-methane; and 1,5-hydroxynaphthalene. One very common polyepoxide is a polyglycidyl ether of a polyphenol, such as bisphenol A.

Another class of epoxy resins are the polyglycidyl ethers of polyhydric alcohols. These compounds may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, trimethylolpropane, and bis(4-hydroxycyclohexyl)-2,2-propane.

Another class of epoxide resins are the polyglycidyl esters of polycarboxylic acids. These compounds are produced by the reaction of epichlorohydrin or a similar epoxy compound with an aliphatic or aromatic polycarboxylic acid such as oxalic acid, succinic acid, glutaric acid, terephthalic acid, 2,6-naphthalene dicarboxylic acid and dimerized linoleic acid.

Still another class of polyepoxides are derived from the epoxidation of an olefinically unsaturated alicyclic compound. These polyepoxides are non-phenolic and are obtained by epoxidation of alicyclic olefins, for example, by oxygen and selected metal catalysts, by perbenzoic acid, by acid-aldehyde monoperacetate or by peracetic acid. Among such polyepoxides are the epoxy alicyclic ethers and esters well known in the art.

Useful epoxides can be prepared from alcohols, e.g., butanol, trimethylol propane, by reaction with an epihalohydrin (e.g., epichlorohydrin), or by reaction of an allyl group with peroxide. The epoxide may be monofunctional or polyfunctional, which can be controlled by selection of the starting material. For example, a monoepoxide can be prepared by reacting a mono-alcohol or mono-acid with an epihalohydrin or a monounsaturate with peroxide, and a polyepoxide can be prepared by reacting a polyol (including diols, triols, and higher-functionality polyols) with an epihalohydrin or a polyunsaturate compound with peroxide. Oligomeric or polymeric polyepoxides, such as acrylic polymers or oligomers containing glycidyl methacrylate or epoxy-terminated polyglycidyl ethers such as the diglycidyl ether of bisphenol A (DGEBPA), can also be used. Epoxidized polyurethane resins or polyester resins can be prepared by reacting OH group-containing polyurethanes or polyesters, as are known in the art, with an epihalohydrin. Epoxides can also be prepared by reacting an isocyanate-terminated component such as a monomeric polyisocyanate (including isocyanurates, e.g., the isocyanurate of isophorone diisocyanate) or polymer or oligomer with glycidol. Other known polyepoxides, e.g., epoxy-novolacs, may also be used.

The alkyd resins useful in the present invention are produced by reacting the polycarboxylic acid and the polyhydric alcohol together with a drying, semi-drying or non-drying oil in proportions depending upon the properties desired. The oils are coupled into the resin molecule by esterification during the manufacturing and become an integral part of the polymer. The oil is fully saturated or predominantly unsaturated. When cast into films, the fully saturated oils tend to give a plasticizing effect to the film, whereas the predominantly unsaturated oils tend to crosslink and dry rapidly with oxidation to give more tough and solvent resistant films. Suitable oils include coconut oil, fish oil, linseed oil, tung oil, castor oil, cottonseed oil, safflower oil, soybean oil, and tall oil. Various proportions of the polycarboxylic acid, polyhydric alcohol and oil are used to obtain alkyd resins of various properties as is well know in the art.

To form a curable composition, such as a coating composition, the polymeric resin compositions, as described above, are combined with a cross-linking agent. The cross-linking agent is one which is capable of reacting with the active hydrogens (normally, but not always provided by—OH hydrogens and sometimes—COOH hydrogens) in the polyester to give a thermoset composition upon curing. Examples of suitable cross-linking agents are aminoplasts and polyisocyanates including blocked polyisocyanates.

Aminoplasts are obtained by the condensation reaction of formaldehyde with an amine or an amide. The most common amines or amides are melamine, urea, benzoguanamine or glycourils. However, condensation with other amines or amides can be employed. While the aldehyde employed is most often formaldehyde, other aldehydes such as acetaldehyde, crotonaldehyde, benzaldehyde and furfural may be used. The aminoplast contains methylol or similar alkylol groups, and preferably, at least a portion of these alkylol groups are etherified by reaction with alcohol to provide organic solvent-soluble resins. Any monohydric alcohol can be employed for this purpose including such alcohols as methanol, ethanol, butanol and hexanol. Preferably, the aminoplasts which are used are melamine-, urea- or benzoguanamine-formaldehyde condensates etherified with an alcohol containing 1 to 4 carbon atoms such as methanol, ethanol, butanol or mixtures thereof. Suitable commercially available products include Resimene products available from Solutia or Cymel products available from Cytec.

Polyisocyanates and blocked polyisocyanates may also be used as curing agents. Examples of suitable polyisocyanates include monomeric polyisocyanates such as toluene disocyanate and 4,4'-methylene-bis(cyclohexyl isocyanate), isophorone diisocyanate and NCO-prepolymers such as the reaction products of monomeric polyisocyanate such as those mentioned above with polyester or polyether polyols. A particularly useful isocyanate is the biuret from 1,6-hexamethylene diisocyanate commercially available from Bayer.RTM. AG as Desmodur.RTM. N.

The polyisocyanate may optionally be blocked. Examples of suitable blocking agents are those materials that would unblock at elevated temperatures such as caprolactam, methyl ethyl ketoxime, or dimethylpyrozole. Blocked isocyanates can be used to form stable one-package systems. Polyfunctional isocyanates with free isocyanate groups can be used to form two-package room temperature curable systems. In these systems, the polyester and isocyanate curing agent are mixed just prior to their application.

The amount of curing agent which is used from about 1 to 70 percent by weight, preferably 5 to 50 percent by weight, based on total weight of the total coating composition.

Critical to the present invention is the addition of a catalyst such as a Lewis Acid catalyst, methane sulfonic acid or perflouroacetic acid or mixtures of these catalysts. It is believed that the catalyst provides a lowered bake temperature and a shortened bake time. Preferred Lewis acid catalysts include aluminum nitrate, iron nitrate, zinc nitrate, zirconium perchlorate, barium nitrate, aluminum sulfate, and aluminum perchlorate and mixtures thereof. Most preferred catalysts for purposes of the present invention include perflouroacetic acid, aluminum nitrate, zinc nitrate, iron nitrate, barium nitrate, aluminum sulfate, and aluminum perchlorate, methane sulfonic acid and mixtures thereof. The catalyst is utilized in an amount between 0.01% and 5.0% by weight based on total coating composition weight. More preferably the catalyst is utilized in an amount between 0.01% to 2.0 % by weight, and most preferably between 0.05 and 1.0% by weight, based on total weight of the coating composition.

Solvent is utilized in the coating composition to adjust the viscosity of the coating composition to that desired for a coil coating process. Solvents are utilized in an amount between 1 and 50% by weight, more preferably between 1 and 40% by weight and most preferably between 1 and 35% by weight based on total coating composition weight. Low boiling solvents, such as aromatic, esters or ketone solvents or mixtures of aromatic ester or ketone solvents are preferred, as quick solvent evaporation is necessary in the method of the present invention. In the case of waterborne coatings, water alone or in mixture with organic solvent or diluent may be used.

In addition to the polymeric component, crosslinking agent and catalyst, the high solids coating composition can optionally contain other hydroxyl functional polymers, pigments, liquid diluents, plasticizers, anti-oxidants, UV light absorbers, surfactants, flow control agents, as are well known in the art.

Substrates coated according to the method of the present invention may be used for a variety of purposes including, but not limited to, automotive parts, appliance parts, and architectural building materials.

In general, coating thicknesses will vary depending upon the application desired. In general, coatings from about 0.01 to 5 mils have been found to be useful in most applications, and coatings from about 0.1 to 1.5 mils have been found to be more useful.

The invention will be farther described by reference to the following examples. Unless otherwise indicated, all parts are by weight.

EXAMPLES

TABLE 1

A pigmented coating composition was prepared comprising the following:

| Ingredient | Amounts (% by weight based on total coating weight) | | | | |
| --- | --- | --- | --- | --- | --- |
| | Control | Ex. 1 | Ex. 2 | Ex. 3 | Ex. 4 |
| Polyester Resin | 30.0 | 30.0 | 30.0 | 30.0 | 27.44 |
| Siliconized Polyester | 6.69 | 6.69 | 6.69 | 6.69 | — |
| TiO₂— | 35.24 | 35.24 | 35.24 | 35.24 | 57.10 |
| Melamine Crosslinker | 6.0 | 6.0 | 6.0 | 6.0 | 6.21 |
| Epoxy Resin | 0.90 | 0.9 | 0.9 | 0.9 | — |
| Flexibilizing Resin | 6.5 | 6.5 | 6.5 | 6.5 | — |
| Wax Base | 2.0 | 2.0 | 2.0 | 2.0 | — |
| Flow Agent | 0.10 | 0.10 | 0.10 | 0.10 | 1.0 |
| Wetting Agent | 0.50 | 0.50 | 0.50 | 0.50 | — |
| Napthalene sulfonic acid catalyst | 0.45 | — | — | 0.21 | — |

TABLE 1-continued

A pigmented coating composition was prepared comprising the following:

| Ingredient | Amounts (% by weight based on total coating weight) | | | | |
| --- | --- | --- | --- | --- | --- |
| | Control | Ex. 1 | Ex. 2 | Ex. 3 | Ex. 4 |
| Aluminum nitrate catalyst | — | 0.65 | 0.65 | 0.35 | — |
| Dinonyl napthalene Sulfonic acid catalyst | — | — | — | — | 0.60 |
| Solvent Mixture | 9.0 | 9.0 | 9.0 | 9.0 | 6.9 |
| Isophorone | — | — | — | — | 2.0 |

A white basecoat was prepared according to the formulations set forth in the Control and Ex. 1 in Table 1. The coatings were evaluated for physical properties after being baked at varying peak metal temperatures and varying cure or dwell times. The results of physical testing are set forth in Table 2.

TABLE 2

Physical Properties of Control and Invention

| PMT* | Dwell** (secs) | Rubs to fail (MEK double rubs) | | Pencil | | Gloss | | T-bend | |
| --- | --- | --- | --- | --- | --- | --- | --- | --- | --- |
| | | Control | Ex. 1 | Control | Ex. 1 | Control | Ex. 1 | Control | Ex. 1 |
| 450° F. | 25 | 100 | 135 | H | 2H | 91 | 89 | 0T | 0T |
| | 15 | 80 | 123 | F | 2H | 89 | 88 | 0T | 0T |
| | 9 | 60 | 115 | HB | H | 88 | 88 | 0T | 0T |
| | 7 | 40 | 92 | <HB | F/H | 88 | 87 | 0T | 0T |
| 400° F. | 23 | — | 130 | — | H | — | 88 | — | 0T |
| | 15 | — | 125 | — | H | — | 87 | — | 0T |
| | 9 | — | 109 | — | F/H | — | 87 | — | 0T |
| | 7 | — | 92 | — | F/H | — | 87 | — | 0T |
| 350° F. | 21 | — | 125 | — | H | — | 89 | — | 0T |
| | 15 | — | 112 | — | H | — | 86 | — | 0T |
| | 9 | — | 108 | — | F/H | — | 87 | — | 0T |
| | 7 | — | 75 | — | HB | — | 87 | — | 0T |

*PMT = Peak Metal Temperature
**Dwell = Time subjected to the PMT

The T-Bend

The T-bend test described in Table 2 is to evaluate adhesion and flexibility of organic coatings applied to metal no thicker than 0.025 in or 0.64 mm, using an impact-type wedge bend test apparatus. This is described in Technical Bulletin 4.2.7 of the National Coil Coaters Association, Revised June 1996. The test is conducted on an impact-type wedge bend apparatus. The instrument contains a 4 lb (1.8 kg) impacter rod with one flat end. The impacter rod slides in a vertical slotted guide and acts as a falling weight to hammer the wedge mandrel with the flat end. A knurled cover inserted in the wedge mandrel impact test hole serves as the impact point. When positioned properly, the lifting knob on the impacter coincides with the zero mark on the guide tube. The spacer block is removed from the front edge of the wedge mandrel so that the taper is 0 to ⅛ in.(3.2 mm) front to back. 4 inch (100 mm) samples are used. Metal thickness should not exceed 0.025 inches (0.64 mm). The test is performed at 77±2° F. (25±1° C.). Test specimens are equilibrated before the test. The test specimen is placed in the apparatus with the side of interest up for direct impact. The desired force is applied by adjusting the height from which the weight is dropped. Force is measured in inch-pounds. The deformed area is examined for cracking. #610 tape is applied to the deformed are and rubbed with pressure to remove air bubbles. The tape is then removed by pulling at a 90° angle in one rapid motion. The degree of cracking and pickoff are measured. For example a measurement of 0 means no cracking and no paint removal by the tape. The measurements range from 0 for no cracking or paint removal to 6 for severe cracking and paint removal. This is described in Technical Bulletin 4.of the National Coil Coaters Association, Revised June 1996.

Pencil Hardness Test

The pencil hardness of the film is that of the hardest pencil that will not cut through the film. The test is described in the National Coil Coaters Association Technical Bulletin No. II.

Gloss Measurement

Gloss or reflecting ability as measured on a glossmeter at a 60° angle, as set forth in ASTM D523.

Solvent Resistance

Mek or toluene is applied to eight ply cheesecloth and rubbed across the specimen for 200 rubs or less if paint fails earlier. This is described in Technical Bulletin 4.of the National Coil Coaters Association, Revised June 1996.

Table 3 Physical Test Results for Various Catalysts

Coatings were prepared to Ex. 1 as set forth in Table 1.

|  | Sample | | | | | | |
| --- | --- | --- | --- | --- | --- | --- | --- |
| Catalyst | A Aluminum Nitrate | B Iron Nitrate | C Magnesium Nitrate | D Cobalt Nitrate | E Barium Nitrate | F Aluminum Sulfate | G Aluminum Perchlorate |
| MEK @ 450° F. | 100 | 100 | 100 | 100 | 100 | 100 | 100 |
| MEK @ 400° F. | 100 | 96 | 75 | 40 | 90 | 100 | 100 |
| MEK @ 350° F.–365° F. | 98 | 85 | 45 | 0 | 88 | 90 | 95 |
| Flex* @ 450° F. | 0T | 0T–1T | 0T–1T | 0T | 0T–1T | 0T–1T | 0T–1T |
| Flex @ 400° F.* | 0T | 0T | 0T | 2T | 0T | 0T | 0T-IT |
| Flex @ 350° F.–365° F.* | 0T | 0T | 2T | N/A | 0T | 0T | 0T |
| Gloss @ 450° F. | 89 | 45 | 95 | 64 | 93 | 90 | 94 |
| Gloss @ 400° F. | 89 | 60 | 91 | 50 | 91 | 89 | 94.5 |
| Gloss @ 350–365° | 88 | 60 | 93 | N/A | 91 | 87 | 92.2 |

*Flex measurements are ranked on a scale where 0 is the most flexible and higher values indicate less flexibility of the coating.

We claim:

1. A method for a lowering the cure temperature of a coil coating composition comprising
    A) applying to a metal coil substrate a low temperature curing coating composition consisting essentially of:
        i) a film forming component consisting essentially of a non-carbamate functional polymeric component selected from the group consisting of polyester, silicone modified polyester, polyurethane, acrylic, epoxy, polyamide, phenolic and polysilane polymers and mixtures thereof;
        ii) a crosslinking component to crosslink the component (i), selected from the group consisting of melamine, unblocked polyisocyanate and blocked polylsocyanate crosslinking components;
        iii) a catalyst selected from the group consisting of (a) Lewis acids selected from the group consisting of aluminum nitrate, iron nitrate, zinc nitrate, zirconium perchlorate, barium nitrate, aluminum sulfate, and aluminum perchchorate and mixtures thereof, and (b) periluoroacetic acid, methane sulfonic acid catalysts and mixtures thereof, and mixtures of (a) and (b), and
        iv) additives selected from the group consisting of solvents, flow control agents, pigments, flexibilizing resins, surfactants, waxes, wetting agents, plasticizers, anti-oxidants, UV light absorbers, and mixtures thereof,
    B) subjecting the coated substrate to cure temperature between 300° F. (148.9° C.) and 450° F.(232.2° C.), for a time between 5 and 60 seconds, to cure the coating, whereby a cure temperature is reduced to a range of a high temperature of 525° F. and a low temperature of 425° F. to a range of a high temperature of 450° F. and a low temperature of 300° F., at equivalent times to achieve equivalent curing.

2. The method of claim 1, wherein the film forming non-carbamate functional polymeric component is selected from the group consisting of polyester, polyurethane and acrylic resins and mixtures thereof.

3. The method of claim 1, wherein the catalyst is present in an amount between 0.01% and 5.0% by weight based on total coating composition weight.

4. The method of claim 1, wherein the catalyst is utilized in an amount between 0.01% to 1.0% by weight, based on total coating composition weight.

5. The method of claim 1, wherein the coil coating composition is cured for a period of 7 to 35 seconds at a temperature of between 300° F. and 450° F.

6. The method of claim 1, wherein the coating passes a T-bend test.

7. A method for coil coating comprising:
    A) Applying to a metal coil substrate a low temperature curing coating composition consisting essentially of:
        i) a film forming component consisting essentially of a non-carbamate functional polymeric component selected from the group consisting of polyester, polyurethane, acrylic epoxy, polyamide, and polysliane polymers and mixtures thereof;

ii) a crosslinking component to crosslink the component (i), selected from the group consisting of melamine, unblocked polyisocyanate and blocked polyisocyanate crosslinking components;

iii) a catalyst selected from the group consisting of (a) Lewis acids selected from the group consisting of aluminum nitrate, iron nitrate, zinc nitrate, zirconium perchlorate, barium nitrate, aluminum sulfate, and aluminum perchchorate and mixtures thereof, and (b) perfluoroacetic acid, methane sulfonic acid catalysts, and mixtures thereof, and mixtures of (a) and (b), and iv) additives selected from the group consisting of solvents, flow control agents, pigments, flexibilizing resins, surfactants, waxes, wetting agents, plasticizers, anti-oxidants, UV light absorbers, and mixtures thereof, B) subjecting the coated substrate to a temperature between 300° F.(148.9° C.) 450° F.(232.2° C.), for a time between 7 seconds and 35 seconds to cure the coating on the substrate, whereby cure temperature is reduced to a range of a high temperature of 450° F. (232.2° C.) and a low temperature of 300° F.(148.9° F.) from a high temperature of 525° F. (273.99° C.) and a low temperature of 425° F. (218.33° C.) for the same coating without component (ii).

8. The method of claim 7, wherein the coating composition consists essentially of as component (i) compounds selected from the group consisting of polyester, acrylic and polyurethane resins and mixtures thereof.

9. The method of claim 7, wherein the catalyst is present in an amount between 0.01% and 2.0% by weight based on total coating composition weight.

10. The method of claim 7, wherein the coating passes a T-bend test.

* * * * *